Jan. 21, 1969  D. G. BAER  3,423,581

REMOTE ILLUMINATION APPARATUS

Filed Oct. 26, 1966  Sheet _1_ of 2

INVENTOR.
Donald G. Baer
BY
Warren D. Hill
ATTORNEY

INVENTOR.
Donald G. Baer
BY
Warren D. Hill
ATTORNEY

United States Patent Office 3,423,581
Patented Jan. 21, 1969

3,423,581
REMOTE ILLUMINATION APPARATUS
Donald G. Baer, Girard, Ohio, assignor to General Motors Corporation, Detroit, Mich., a corporation of Delaware
Filed Oct. 26, 1966, Ser. No. 589,692
U.S. Cl. 240—8.16
Int. Cl. B60q 3/04
12 Claims

ABSTRACT OF THE DISCLOSURE

Fiber optics are used for illuminating objects remote from a light source, particularly for automotive vehicles. The fiber optic members are provided with metal ferrules and sockets are provided to engage the ferrules for holding the ends of the fiber optic members adjacent the light source and the object to be illuminated.

---

This invention relates to illumination means and more particularly to a fiber optic illumination system and components thereof.

It has long been known that light can be transmitted to locations remote from a light source by means of plastic rods or by bundles of glass or plastic fibers, each fiber core being coated with a substance having an index of refraction lower than that of the core. These bundles, when suitably protected in a jacket, are flexible. Such devices have been very expensive and have been used only for highly specialized and limited applications. In addition, there have been suggestions of how the fiber optics principle may be applied to large scale production devices such as automotive vehicles.

Specifically, it has been proposed for vehicles to incorporate fiber optics to carry a light signal from a tail light or other vehicle light to a location visible to the vehicle operator to indicate to the operator that the lamp is properly functioning. Another suggested application has been to use light conducting material to provide illumination of items such as ashtrays and control knobs on the vehicle dashboard. Until the present invention, however, there has been no known means of carrying out the suggestions in an efficient and economical manner. Previously proposed systems have been so costly that their use on large scale production items such as automobiles has been economically prohibitive. There has been a genuine need for many of the applications now made practical by this invention. Electrical lighting, with the incident separate bulbs and other parts, has, of necessity, sometimes been utilized where it was not economical. Moreover, some areas where illumination has been desirable have remained dark because of the impracticability of electrical illumination.

As a consequence of the invention, it is now economically practical to provide fiber optic illumination in many areas of automotive vehicles such as flood lighting or slot lighting of door locks, and ignition switches, illumination of ash trays, cigarette lighters, control knobs, transmission selector indicators, radio dials and the like. In addition, direct monitoring of vehicle headlights, tail lights, directional signals and the like can be achieved.

It is a general object of this invention to provide illumination to areas remote from a light source, particularly in automotive vehicles.

Another object of this invention is to provide an inexpensive fiber optics system and components therefor.

Still another object of the invention is to provide a fiber optics system which is not only made up of inexpensive components but also which is easily and inexpensively assembled.

A further object is to provide a fiber optics system which may be readily installed in automotive vehicles.

Yet another object is to provide terminal fittings for use in fiber optics systems as well as other associated components.

It is another object to provide a fiber optics system and components therefor that is especially suitable for installation in a car or truck in conjunction with the electrical wiring system and in which the fiber optics components may be positioned for use by inserting the same in snap-acting receptacles that position the components to receive illumination or to display illumination without any particular indexing adjustments.

These objects are carried out by providing a light conducting member with terminal means for supporting the light conducting member at each end adjacent a light source and to a location or object to be illuminated.

The invention is further carried out by providing terminal means to be secured to an end of a light conducting member having means to engage the jacket of the member, means to facilitate the insertion of the member through the terminal means, and a stop portion.

The invention is further carried out by providing receptacle means for engaging terminal means and for supporting the terminal means in a suitable position adjacent the light source or adjacent the object or location to be illuminated.

The above and other advantages will become more apparent from the following specification in conjunction with the drawings wherein like reference numerals refer to like parts and wherein.

Figure 1:
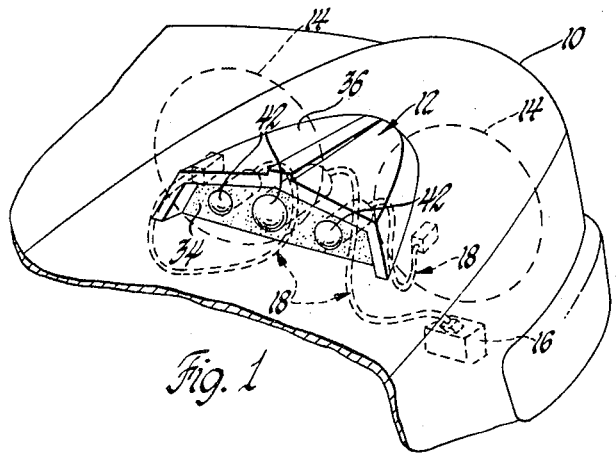
FIGURE 1 is a perspective view of a fiber optics system installed in the fender of a vehicle.

FIGURE 1 illustrates an automobile front fender 10 having a lamp monitor display housing 12 mounted on the top thereof. In dotted lines are shown two headlamps 14, a parking lamp housing 16 and three flexible light conductors 18 leading therefrom. The light conductors 18 each extend from a lamp 14 or lamp housing 16 to a position within the lamp monitor display housing 12.

Figure 2:
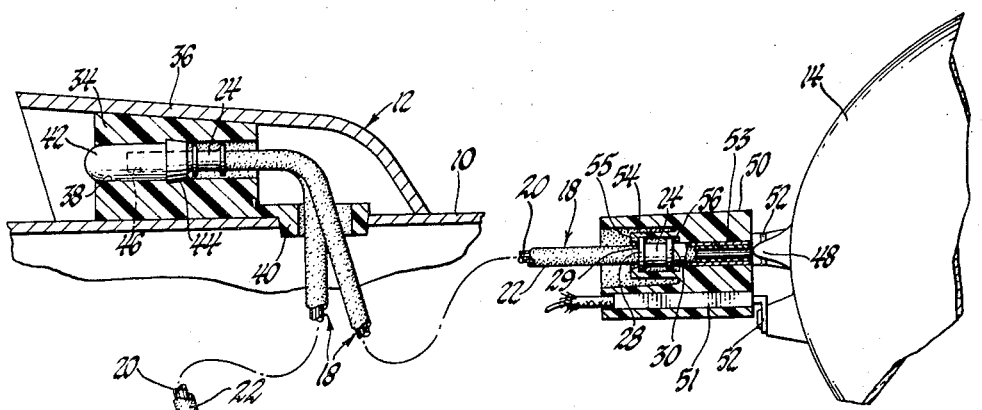
FIGURE 2 is a cross-sectional view of the fiber optics system of FIGURE 1.
Figure 2:
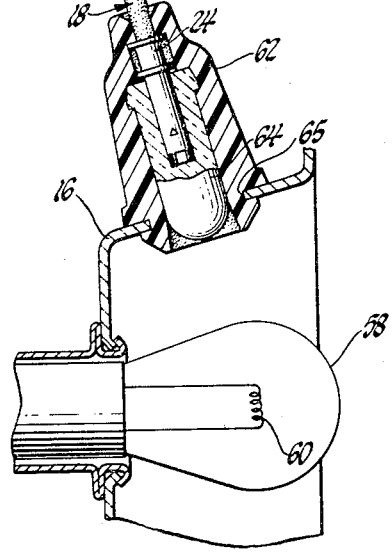

This system is further illustrated in FIGURE 2 where it can be seen that the light conductors 18 each comprise a bundle of flexible fibers 20 covered by a tough protective jacket 22. Sixteen fibers or a multiple thereof are included in each bundle. The diameter of each fiber is 0.010 inch. The outside diameter of a light conductor containing 16 fibers is 0.087 inch and conductors having more fibers are correspondingly larger. The fibers may be glass but preferably they are composed of a relatively low cost plastic core material such as polymethyl methacrylate coated with a polymer having a refractive index lower than that of the plastic core. The sheath or jacket 22 material is preferbly polyethylene but may be other flexible material impervious to moisture and to other environmental agents which might degrade the light conducting qualities of the fibers. The jacket is extruded around the fiber bundle 18 so as to intimately engage the bundle thereby forming an integral structure. Each light conductor 18 has a terminal fitting or ferrule 24.

Figure 3:
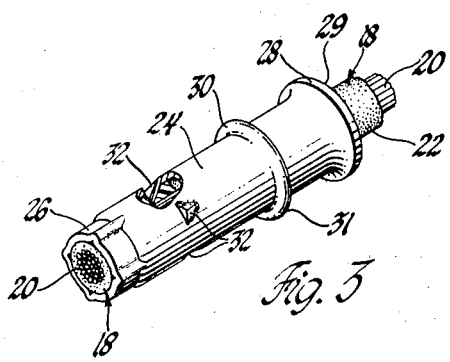
FIGURE 3 is a partly broken away perspective view of a terminal fitting for a fiber optics conductor according to the invention.

As best shown in FIGURE 3, the ferrule 24 is a generally tubular brass element having at its forward end adjacent an end of the light conductor 18 a plurality of flat crimped areas 26 which insure that the end of the light conductor 18 will be centered within the ferrule even if the conductor 18 should have an outer diameter slightly less than the inner diameter of the ferrule. The rear end of the ferrule terminates in a rearwardly and outwardly flared portion 28 which serves a dual purpose. The flare facilitates the insertion of the conductor 18 into the ferrule and also provides an annular lip or shoulder 29 to be engaged by a locking means which will be described below. Between the end portions there is a collar or flange 30 surrounding the ferrule which also serves a dual purpose. The flange acts as a stop when the ferrule is inserted into a mating receptacle, and, like the flare 28, provides an annular lip or shoulder 31, axially spaced from lip 29, which may be engaged by a locking tab on the mating receptacle. Between the flange and the forward end of the ferrule a plurality of darts 32 are equally spaced around the ferrule and are formed by staking or piercing so that the darts project into the sheath 22 but do not penetrate into the fibers 20. Moreover, the darts are made as sharp as possible to penetrate the rough sheath 22 without imposing a high pressure on the fibers 20, since the coating on the fibers is delicate and will be damaged by high pressure. It is evident then that the darts 32 are the means for holding the ferrule 24 to the conductor 18.

Referring again to FIGURES 1 and 2, the display housing 12 includes a body portion 34 and a cover 36 mounted on the fender 10. The body portion is made of relatively soft elastic material and includes three apertures 38. The body portion 34 terminates at its rear in a grommet-like portion 40 which extends through an aperture in the fender 10. A lens 42 preferably made of transulcent colored molded plastic, snaps into each aperture 38 from the front thereof and has a retaining flange 44 at the rear thereof, which radially expands the soft body on insertion to lock the lens in place. The ferrule 24 is pressed into a cylindrical cavity 46 in the lens 42 from the rear thereof and is frictionally retained therein. The headlamp is of the conventional sealed variety having a reflective rear surface which is opaque except for the exhaust tip 48 which is transparent and therefore provides a window to emit light. One of the conductors 18 which extends to headlamp 14 is held in place at the exhaust tip 48 of the lamp 14 by a conventional electrical headlamp connector 50 modified to provide a female receptacle for the ferrule 24. The connector 50 is comprised of a resilient plastic such as polypropylene. The electrical connector contains electrical contacts 51 which mate with electrical terminals 52 of the headlamp so that an electrical connection is formed and additionally, mechanical support of the connector 50 by the headlamp is provided. Further, the connector 50 is formed with a cylindrical aperture or bore 53 aligned with the exhaust tip 48. A pair of resilient locking fingers 54 extend rearwardly of the aperture and each bears an inwardly facing hook portion 55 at its outer extremity to jointly provide a shoulder facing toward the lamp. Together the fingers define a bore which is larger than the aperture 53 and coaxial therewith. The junction of the aperture 53 and the bore form a shoulder 56 facing toward the hook portions 55. The locking fingers 54 are sufficiently flexible to permit the insertion of the ferrule into the aperture and by engaging the flared end 28 on the ferrule prevent the removal thereof. This engagement takes place upon insertion of the ferrule 24 from the left as seen in FIGURE 2, which cams fingers 54 radially outwardly. The fingers then snap radially into overlay shoulder 28 and bear against annular lip 29 to hold the ferrule in position. The shoulder 56 formed at the base of the fingers 54 is adapted to abut the flange 30 on the ferrule to limit the forward movement of the ferrule upon its insetrion into the connector 50. The parking lamp housing 16 contains a lamp 58 having a filament 60. A grommet 62 of rubber or rubber-like material fits into an aperture or window 65 in the side of the housing 16 so as to be axially aligned with the filament 60. The grommet 62, like the body 34, has an aperture for receiving a lens 64 at one end and a ferrule 24 from the other end so that the ferrule mates with a cavity within the lens 64. As shown, the light conductors extend from the display housing 12 to the lamp 14 and the lamp housing 16 by passing through the grommet portion 30 of the body 34. It will be apparent that the light passing rearwardly through the exhaust tip 48 of the lamp 14 impinges on the bare end of the conductor 18 and will be transmitted to one of the lenses 42 in the display housing 12. The focal length of the lens 42 and the disposition of the lens within the housing are so selected that the light passing from the bundle 18 is readily observed by the vehicle operator so that he can determine whether the lamp 14 is illuminated. Similarly, the light from the parking lamp 58 is transmitted to another lens 42 for the operator to observe. Since the parking lamp 58 is conveniently used as a turn signal lamp, it will be used during the daytime as well as in darkness. A means is provided to increase the intensity of the light signal passing through conductor 18 so that the illuminated lens 42 will be easily noticed in the daytime. This intensifying means is the lens 64 which is a collector lens having a focal length suitable to focus the light from the filament 60 into the end of the conductor 18.

Figure 4:
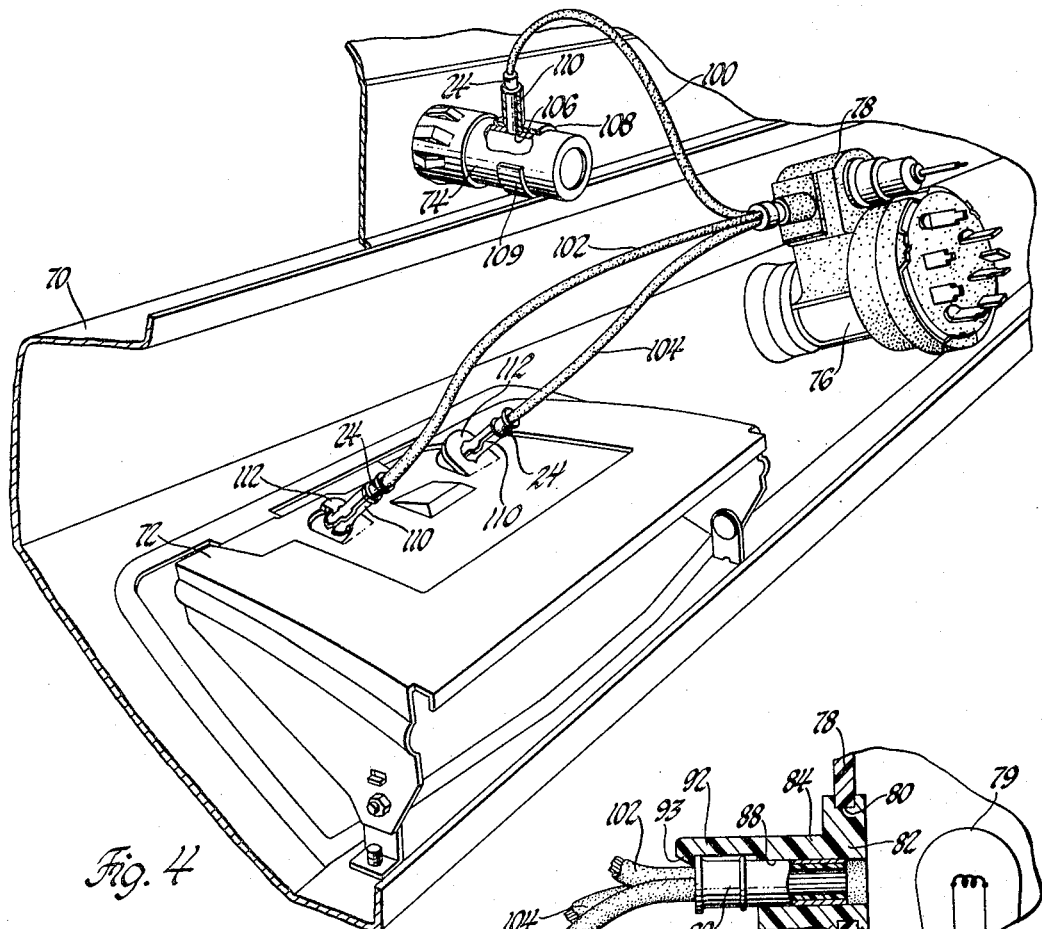
FIGURE 4 is a perspective view of a fiber optics system according to the invention installed behind the dashboard of a vehicle.
Figure 5:
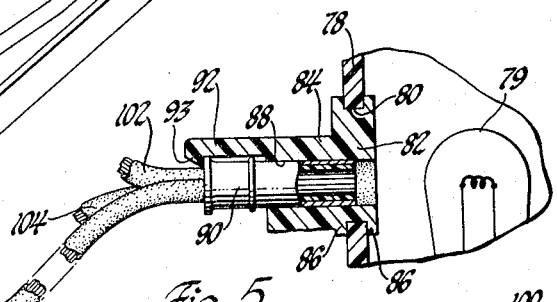
FIGURE 5 is a cross-sectional view of a portion of the fiber optics system of FIGURE 4.
Figure 6:
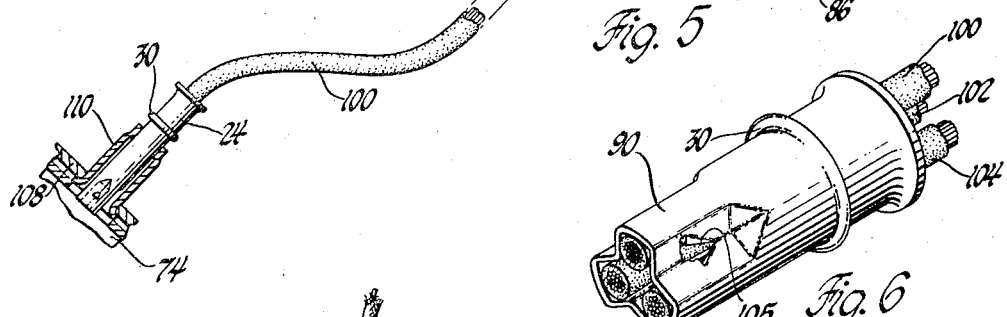
FIGURE 6 is a partly broken away perspective view of a terminal fitting for a plurality of fiber optics conductors according to the invention.

In FIGURE 4 there is illustrated means for illuminating two compartments of a vehicle ashtray and a cigarette lighter from a common remotely located light source. FIGURE 4 is a view of the rear portion of a vehicle dashboard 70 containing an ashtray assembly 72, a cigarette lighter housing 74 and an ignition switch assembly 76. The assembly 76 has mounted to the top thereof a lamp housing 78. As best shown in FIGURE 5, the housing 78 containing lamp 79 has a slot or window 80 therein to receive a plastic adapter 82. The adapter has a base portion 84 with flanges 86 slidably engaging the edges of the slot 80. The base portion also contains a cylindrical opening 88 to receive ferrule 90. A locking finger 92, having a hooked end portion 93, extends from the base portion 84 and engages the flared end portion of the ferrule to retain the ferrule within the adapter. The ferrule 90 as best shown in FIGURE 6 is the same as the ferrule 24 previously described except that in order to accommodate three light conductors 100, 102 and 104 the front portion is swedged into a clover leaf shape cross-section to firmly grasp two sides of each conductor. Three darts 105 are so located that each one pierces the jackets of two adjacent conductors. The adapter 82 is so located and so positioned that the ferrule 90 is aligned with the filament of the lamp 79 thereby permitting the light therefrom to enter directly into the ends of the three light conductors. The light conductor 100 extends from the lamp housing 78 to the cigarette lighter housing 74 which has an opening 106 to permit light from the conductor 100 to shine into the interior of the housing 74 thereby illuminating the lighter housing when the lighter is removed therefrom. The terminal 24 of the light conductor 100 is held in place in the opening 106 by a clip 108 which has a band portion 109 surrounding the housing of lighter 74 and which supports a tubular friction type fastener 110 at the opening. The ashtray compartments are illuminated by the light from conductors 102 and 104 which have their terminals 24 secured to bent-up tabs 112 in the top of the ashtray assembly 72. The terminals 24 are held in place by tubular friction type fasteners 110 like those used with the cigarette lighter. The flange 30 of the terminal 24 will serve as a stop to prevent the terminal from sliding too far into the fastener.

It will thus be seen that this embodiment of the invention provides for the illumination of four objects from one light source. The ignition switch 76 will be illuminated directly by the light source while the cigarette lighter 74 and two compartments of the ashtray assembly 72 will be illuminated by light carried by the conductors 100, 102, and 104 from the same light source. It will further be seen that the systems employed utilizes inexpensive, sturdy, reliable components which are easily assembled and readily installed in the vehicle.

Figure 7:
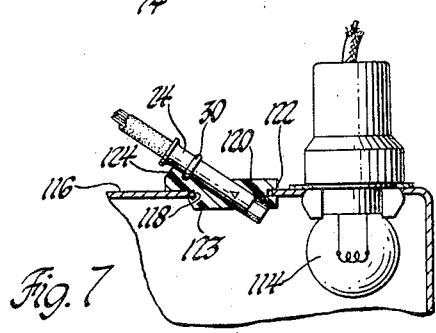
FIGURE 7 is a cross-sectional view of a fiber optics assembly including a light conductor supported adjacent a light source according to the invention.

Another means of retaining the terminal 24 of a light conductor adjacent a light source 114 is illustrated in FIGURE 7. There a lamp 114 is secured to a metal panel 116. A rectangular opening 118 in the panel adjacent the lamp receives a resilient plastic receptacle 120 which has flanges 122 mating with one edge of the opening 118, and another flange 123 gripping the opposite edge of the opening. The flange 123 has a beveled lower surface so that the receptacle may be snapped into the opening. This assembly is accomplished by first engaging the flanges 122 with one edge of the opening 118 and then pushing the receptacle down into the opening so that the flange 123 cams over the other edge of the opening to snap into place. The receptacle includes a cylindrical aperture having its axis aligned with the filament of the lamp 114 so that when a conductor is inserted through the aperture, it is aimed at the filament. The receptacle 120 includes a resilient locking tab 124 to engage the flange 30 of the ferrule. It is apparent then that in this application, the flange 30 serves as a locking element as well as a stop to thereby prevent axial movement of the ferrule 24 in either direction after it has been snapped into place in the receptacle.

In the manufacture of the light conductor assemblies the light conductors are made in lengths of several thousand feet and stored in the form of coils. Then a desired length of conductor is cut from the coil by any suitable means and each end is inserted through the flared end of a ferrule 24 and positioned so that a small amount of excess conductor extends beyond the ferrule. The darts 32 are formed by staking to secure the ferrules to the conductor and the forward ends of the ferrules are crimped to produce flat areas 26 for centering the fiber optics bundle within the ferrule. Then the excess conductor is trimmed. The trimming is a critical operation since for optimum light transmission the bundle must be cut substantially at right angles to the conductor axis, the fiber ends must be smooth and preferably polished, and the fiber ends must be clean and unobstructed. All these requirements are difficult to meet by ordinary cutting methods but it has been found that satisfactory trimming is accomplished by utilizing a rotating circular blade with a smooth cutting edge. Preferably the speed of the cutting edge is at least 7000 feet per minute and the direction of feed of the conductor opposes the direction of blade rotation. It is desirable to trim the conductor approximately 1/32 inch past the front of the ferrule so that in the event of shrinkage of the fiber bundle 20 the jacket 22 will not be pressed inward by the crimp on the ferrule and obscure the bundle.

It will be seen that this invention makes practical for the first time the large scale use of fiber optics light conductors. The components of the system and their assembly are so inerpensive and so flexible in application that fiber optics now can be used in mass production and in highly competitive products such as automobiles and trucks, whereas previously their use has been limited to very expensive and highly specialized applications.

While the preferred embodiments of the invention is illustrated herein, the scope of the invention is not limited thereto but is defined only by the following claims.

I claim:

1. Means for providing illumination in an automotive vehicle at a location remote from a light source including a flexible light conducting member extending between the light source at one end and the said location at the other end, the member comprising a fiber optic bundle jacketed in a protective plastic sheath along the entire length of the bundle, terminal means secured to the said one end of the member, the terminal means comprising a metal ferrule attached to the sheath, means adjacent the light source for engaging the terminal means to secure the said one end of the member in a position illuminable by the light source, and second terminal means comprising a metal ferrule attached to the sheath at the other end of the member, wherein each metal ferrule consists of a generally tubular element having a front portion adjacent an end of the member, a rear portion terminating in an outwardly flared flange and an intermediate flange between the front and rear portions.

2. Means for providing illumination as described in claim 1 wherein the ferrule is secured to the sheath by a plurality of darts in the tubular element extending part way into the sheath.

3. Means for providing illumination in an automotive vehicle at a location remote from a light source including a flexible light conducting member extending between the light source at one end and the said location at the other end, the member comprising a fiber optic bundle jacketed in a protective plastic sheath along the entire length of the bundle, the fiber optic bundle including a plurality of individual transparent plastic fibers each coated with a material having a refractive index lower than that of the said transparent plastic, terminal means secured to the said one end of the member, the terminal means comprising a metal ferrule attached to the sheath, the ferrule consisting of a generally tubular element having a front portion adjacent the one end of the member, a rear portion terminating in an outwardly and rearwardly flared flange, an intermediate flange between the front portion and the rear portion and means for securing the ferrule to the sheath, and means adjacent the light source for engaging the terminal means to secure the said one end of the member in a position illuminable by the light source, comprising a female receptacle having a cylindrical aperture extending completely therethrough for receiving the terminal means and further having locking means engaging the terminal means for retaining the terminal means within the receptacle.

4. Means for providing illumination as described in claim 3 wherein the locking means comprises a resilient tab engaging a flange on the ferrule and wherein the female receptacle includes a shoulder portion surrounding the ferrule and adapted to abut the intermedite flange.

5. Means for providing illumination at a location remote from a light source comprising in combination: a flexible light conducting member extending from the light source at one end and said location at the other end, the member comprising a fiber optic bundle jacketed in a protective plastic sheath along the entire length of the bundle; a housing for the light source having a window; a body of resilient material mounted adjacent the said window; the body having a bore with an axis extending toward the light source, the body further having a portion remote from said light source comprising a resilient finger offset from said axis and with a hook portion that defines a shoulder facing the light source; a ferrule at the end of the light conducting member partially within the bore of said body; said ferrule defining a first annular shoulder located outboard of the bore and adjacent thereto and a second annular shoulder within and adjacent to the first mentioned shoulder to retain the ferrule in position.

6. Means for providing illumination as described in claim 5 wherein the portion remote from said light source includes a plurality of resilient fingers offset from said axis and concentric therewith to define a second bore of larger diameter than the first mentioned bore and contiguous therewith, the fingers having hook portions that together define a shoulder facing the light source.

7. Means for providing illumination as described in claim 5 wherein the housing includes an opaque portion and the said window is a transparent exhaust tip in the opaque portion, the housing bearing electrical terminals adjacent the exhaust tip; the body of resilient material containing electrical connector means engaging the electrical terminals for making electrical contact therewith and for supporting the body of resilient material adjacent the window.

8. Means for providing illumination as described in claim 5 wherein the window is an aperture in the housing, and the body of resilient material mounted adjacent the window includes two pairs of opposed flange portions defining slots mating with the edge of the aperture in the housing, thereby supporting said body within said window.

9. Means for supporting a light conducting member adjacent a light source comprising in combination: a lamp having an exhaust tip through which light is emitted and having external electrical terminals adjacent the exhaust tip; and a combined electrical connector and light conducting member retaining means comprising an insulating resilient body, electrical conductors within the body mating with the electrical terminals to provide electrical contact therewith and mechanical support thereon, the body having a bore aligned with the exhaust tip for receiving an end of the light conducting member and for retaining the member within the bore.

10. Means for supporting a light conducting member as described in claim 9 wherein the bore has a portion of substantially uniform diameter adjacent the exhaust tip and a portion remote from said exhaust tip defined by a plurality of resilient fingers at spaced intervals about the axis of the bore and with hook portions that together define a shoulder facing the exhaust tip; and a ferrule at the end of the light conducting member within the bore, the ferrule defining an annular lip in engagement with said shoulder whereby the light conducting member is retained within the bore.

11. An end fitting for an elongated flexible light conducting member having a plastic sheath along its entire length, comprising an annular metal ferrule having a front portion to be disposed substantially flush with an end of the member, a rear portion terminating in an outwardly and rearwardly flared flange portion, a flange intermediate the front and rear portions, means for partially penetrating the sheath comprising a plurality of darts in the wall of the ferrule, and means for centering the member within the ferrule comprising a plurality of crimped flat areas in the front portion.

12. An end fitting for an elongated flexible light conducting member having a plastic sheath along its entire length, comprising an annular metal ferrule having a front portion to be disposed substantially flush with an end of the member, a rear portion terminating in an outwardly and rearwardly flared flange portion, means for partially penetrating the sheath comprising a plurality of darts in the wall of the ferrule, and means for centering the member with the ferrule comprising a plurality of crimped flat areas in the front portion.

References Cited

UNITED STATES PATENTS

| | | | |
|---|---|---|---|
| 2,198,443 | 4/1940 | Paul et al. | 240—8.4 |
| 2,245,755 | 6/1941 | Carpenter | 240—8.4 |
| 3,131,690 | 5/1964 | Innis et al. | 240—1 |
| 3,278,739 | 10/1966 | Royka et al. | 240—8.16 |
| 3,335,392 | 8/1967 | Elliot | 339—97 |
| 3,285,242 | 11/1966 | Wallace | 240—1 |

FOREIGN PATENTS

| | | |
|---|---|---|
| 1,193,096 | 4/1959 | France. |
| 964,567 | 7/1964 | Great Britain. |

NORTON ANSHER, *Primary Examiner.*

W. A. SIVERTSON, *Assistant Examiner.*

U.S. Cl. X.R.

240—1, 8.4